United States Patent Office 3,830,875
Patented Aug. 20, 1974

3,830,875
METHOD OF IMPROVING PAINT ADHESION TO LOW-SHRINK POLYESTER-BASED RESINS
Edmund R. Meincke, Cuyahoga Falls, and Willem J. van Essen, Tallmadge, Ohio, assignors to The General Tire & Rubber Company
No Drawing. Continuation of abandoned application Ser. No. 287,177, Sept. 7, 1972, which is a continuation of abandoned application Ser. No. 82,824, Oct. 21, 1970. This application May 23, 1973, Ser. No. 363,209
Int. Cl. C08f 43/02
U.S. Cl. 260—862
3 Claims

ABSTRACT OF THE DISCLOSURE

Paint adhesion to cured polyester-based resins is severely deteriorated by the addition of low-shrink additives to the uncured resin. This invention is a method of improving paint adhesion to low-shrink formulated polyester-based resins by the addition of certain nitrogen-containing vinyl monomers to the uncured resin.

---

This application is a continuation of application Ser. No. 287,177, filed Sept. 7, 1972 which was a continuation of application Ser. No. 82,824, filed Oct. 21, 1970, both now abandoned.

BACKGROUND OF THE INVENTION

Field of the Invention

This invention relates to the field of polymeric chemistry. More particularly, this invention relates to thermosetting polyester-based resins and to additives thereto that improve adhesion of paint.

DESCRIPTION OF THE PRIOR ART

Polyester-based resins make up a large portion of the thermosetting resin trade. Generally they comprise the addition-type reaction product of a major amount of an unsaturated polyester and a minor amount of a crosslinkable monomer (hence the term "polyester-based"). They may contain a variety of additives and may be formulated with reinforcing fibers into sheet molding compounds (SMC), bulk molding compounds (BMC), and hand-layup molding compounds, all known under the generic terms "fiber reinforced polyester" or "FRP" plastics.

Many products are made from polyester-based resins such as automobile parts, household appliance housings, hand tools, rocket nose cones, etc. Where decoration or surface finishing is required, there has been little, if any, difficulty encountered. Cured polyester-based resins are chemically inert for the most part and are receptive to most conventional paints and lacquers. Development in another area of these resins, however, has created difficulties with respect to their paintability.

A severe problem in FRP processing is shrinkage of the plastic during molding and curing. The density of the crosslinked polymer is significantly greater than the sum of the densities of the separate starting liquids so that, during polymerization, the molded plastic undergoes a decided volumetric decrease. This shrinkage is sufficient to prevent accurate molding of many parts, especially where the part is large and must have a smooth surface. Shrinkage shows up as indentations or sink-holes on the surface of the part, usually in areas where there is an abrupt change in thickness such as at bosses and ribs.

In an effort to control this shrinkage, certain formulation changes have been made in conventional polyester-based resins. Generally, these changes comprise the addition of one or more "low-shrink" or "low-profile" additives; these are usually finely divided particles of thermoplastic resins, see Australian Pat. 24,802/67. Although these formulation changes have greatly reduced shrinkage they have created serious problems in fininishing the cured part, namely they severely deteriorate the adhesion of paints to the surface of the cured polyester-based resin.

It is theorized that part of this deterioration is caused by the low-shrink or low-profile additives migrating to the surface during polymerization. As thermoplastic resins are known to be less polar than thermosetting resins, this migration causes the surface to become less polar and thus less receptive to bonding with paints and other finishes.

This invention is based upon the surprising discovery that addition of small amounts of certain nitrogen-containing vinyl monomers to the uncured low-shrink polyester-based resin will increase the degree of adhesion between the resin and overlying layers of paint. The increase in paint adhesion produced by this invention is at least to the degree of conventionally formulated polyester-based resins with the same paint and in many cases to a higher degree.

Therefore, the main object of this invention is a method of improving paint adhesion to cured, low-shrink polyester-based resins. Other objects include a method that does not affect other properties of the cured FRP, that is easy to perform, and that is amenable to automatic and semi-automatic process control. These and other objects will become more apparent upon reading the Description of the Preferred Embodiment attached hereto.

SUMMARY OF THE INVENTION

This invention concerns a method of improving adhesion of paint to the surface of a cured, low-shrink polyester-based thermosetting resin comprising adding from about 5 to about 30 parts by weight per 100 parts polyester resin of a nitrogen-containing vinyl monomer selected from the group consisting of acrylamide, methacrylamide, and dimethyl-amino ethyl methacrylate to said resin prior to curing.

DESCRIPTION OF THE PREFERRED EMBODIMENT

This invention is applicable to low-shrink or low-profile polyester-based resins as that term is used in the plastics art. Polyester-based resins generally are blends of unsaturated polyester resins and crosslinkable monomers. Polyesters generally are made by esterifying (condensing) polycarboxylic acids and glycols and removing water to form a viscous liquid or meltable solid containing relatively few residual carboxyl groups, i.e. having a relatively low acid number. Examples of polycarboxylic acids usable in the preparation of polyester resins include dicarboxylic acids such as oxalic; malonic; succinic; glutaric; adipic; pimelic; suberic; azelaic; sebacic; fumaric; maleic; phthalic (anhydride); isophthalic; terephthalic hexahydroterephthalic; tetrachlorophthalic (anhydride); chlorophthalic (anhydride); diphenic; and nitrophthalic acid; and tricarboxylic acids such as tricarballylic acid and citric acid. Examples of glycols usable in preparing polyester resins include ethylene glycol; propylene glycol; ethylene glycol carbonate; butane 2,3-diol; trimethylene glycol; butane 1,3-diol; 2-methyl propane 1,3-diol; 2,2-dimethyl propane 1,3-diol; 2,2-diethyl propane 1,3-diol; cis-but-2-ene-1,4-diol; trans-but-2-ene-1,4-diol; tetramethylene glycol; pentamethylene glycol; hexamethylene glycol; heptamethylene glycol; octamethylene glycol; nonamethylene glycol; decamethylene glycol; undecamethylene glycol; dodecamethylene glycol; tridecamethylene glycol; tetradecamethylene glycol; octadecamethylene glycol; eicosylene glycol; diethylene glycol; triethylene glycol; tetraethylene glycol; etc.

Into the resultant polyester resin is blended a crosslinkable monomeric material that enters into polymerization with the unsaturation (double bonds) carried over from the carboxylic acid into the polyester during the esterification reaction. The crosslinking monomer is generally a monomeric liquid containing at least one $CH_2=C<$ group and generally characterized as a vinyl-containing monomer. These monomers may be of the aliphatic type, aromatic type, heterocyclic type, or a mixture thereof. Typical monomers include styrene, chlorostyrene dichlorostyrene, alkyl styrene, α-methyl styrene, vinyl naphthalene, diallyl phthalate, diallyl maleate, diallyl fumarate, diallylsuccinate, ethyl-vinyl ether, diallyl ether, methylallyl ethyl ether, methylvinyl ketone, divinyl ketone, methyl-allyl ketone, methyl acrylate, ethyl acrylate, methyl methacrylate, acrylonitrile, methacrylonitrile, and the like. These crosslinking monomers are blended with the polyester resin to produce a highly viscous crosslinkable or curable polyester-based resin material. Generally speaking, crosslinking or curing is produced by the application of heat in conjunction with the use of a free radical generating catalyst.

Many other additives may be incorporated into the polyester-based resin such as the aforedescribed free radical generating catalyst. Examples of free radical generating catalysts include such materials as lauroyl peroxide, benzoyl peroxide, parachloro benzoyl peroxide, 2,4-dichloro benzoyl peroxide, methylethyl ketone peroxide, cyclohexanone peroxide, methyl isobutyl ketone peroxide, dicumyl peroxide, 2,2-bis(4,4-ditertiary butyl peroxy-cyclohexyl propane), tertiary butyl peracetate, tertiary butyl perbenzoate, and azo-bis-isobutroylnitrile. Other additives may also be incorporated such as antioxidants, fillers, organic and inorganic colorants, lubricants, blowing agents, adhesives, odorants, modifiers, solvents, dispersing agents, wetting agents, and other polymeric materials such as thermosetting resins, thermoplastic resins, and elastomers. All of these additives may be used in conjunction with the polyester-based resin compounds of this invention without detracting from the benefits derived by the use of the nitrogen-containing vinyl monomers of this invention.

These polyester-based resins are rendered low-shrink or low-profile by the addition of thermoplastic resins such as polymethyl methacrylate, polypropylene, polyethylene, high-impact polystyrene, etc., usually in solution with a crosslinkable monomer such as styrene. This technology is explained in Australian Pat. 24,802/67.

The method of this invention comprises adding from about 5 to abont 30 parts by weight per 100 parts polyester resin or polyester resin-crosslinking monomer combination of a nitrogen-containing vinyl monomer selected from the group consisting of acrylamide, methacrylamide, and dimethyl-amino ethyl methacrylate to the uncured resin sometime prior to curing the resin. Acrylamide, methacrylamide, and dimethyl-amino ethyl methacrylate are easily blended into the formulation along with the other additives. They may be added at any stage in the formulating, the prime requisite being that they be homogeneously blended in the formulation prior to curing. The thus formulated polyester-based resin is thereafter directly processable into a finished article, or may be mixed with various natural or synthetic fibrous materials in the form of loose fibers (bulk molding compounds) or with woven or nonwoven sheets of fibrous material (sheet molding compounds) and thereafter molded to the desired shape and heated to produce crosslinking or curing of the material.

While these monomers may be used in amounts ranging from about 5 to about 30 parts by weight per 100 parts of polyester-based resin, it is preferred to use from about 7 to about 15 parts by weight per 100 parts polyester-based resins as the benefits derived from the use thereof, i.e. the increasing degree of paint adhesion, is maximized within this latter range. The amount of monomer is based upon the polyester resin; as some polyester resins are marketed in solution with styrene or other crosslinkable monomer, one should determine the amount of polyester in the solution and use this quantity as the basis from which to base succeeding calculations. The use of these novel monomers does not alter the curing conditions conventional for these resins as long as no more than about 30 parts are used; more monomer results in deterioration of the cured resin's physical properties.

Onto the finished or cured low-shrink polyester resin are thereafter applied coatings of primer or top coat paint or both for the purpose of giving additional protection to the finished material, decorating the part, or a combination of these and other reasons.

The paints that may be used on the cured low-shrink polyester-based resin may be thermoplastic or thermosetting resin-containing coatings of the solvent-based or the emulsion-based type. The solvent-based coatings may be either an oil-based or an alkyd-based material. Of the oil-based paints the most widely used are linseed oil and soybean oil that polymerize into hard, durable coatings through chemical reaction catalyzed by the oxygen in the air. The alkyd-based coatings usable herein are formed by an esterification-condensation type reaction between a polybasic acid and a polyhydric alcohol and are either employed alone or in combination with modifying ingredients such as non-drying oils, semi-drying oils, drying oils, fatty oils, fatty acid oils, and mixtures thereof.

Examples of polybasic acids include phthalic acid, isophthalic acid; terephthalic acid; tetrachlorophthalic acid; maleic acid; dodecylmaleic acid; octadecenylmaleic acid; fumaric acid; aconitic acid; itaconic acid; trimellitic acid; tricarballylic acid; 3,3'-thiodipropionic acd; 4,4'-sulfonyldihexanoic acid; 3-octenedioic-1,7 acid; succinic acid; adipic acid; 1,4-cyclohexadiene-1,2-dicarboxylic acid; 3-methyl-3,5-cyclohexadiene - 1,2 - dicarboxylic acid; 8,12-eicosadienedioic acid; 8-vinyl-10-octadecenedioic acid; and the corresponding acid anhydrides, acid chlorides, and acid esters such as phthalic anhydride, phthaloyl chloride, and the dimethyl ester of phthalic acid.

Examples of polyhydric alcohols usable herein include glycerol; polyglycerol; pentaerythritol; polypentaerythritol; mannitol; trimethylolpropane; sorbitol; methyltrimethylomethane; 1,4,6-octanetriol; butanediol; pentanediol; hexanediol; dodecanediol; octanediol; chloropentanediol; glycerol monallyl ether; glycerol monoethyl ether; triethylene glycol; 2-ethylhexanediol-1,4; 3,3'-thiodipropanol 4,4'-sulfonyl-dihexanol; cyclohexanediol-1,4; 1,2,6-hexanetriol; 1,3,5-hexanetriol; polyallyl alcohol; 1,3-bis-(2-hydroxyethoxy) propane; 5,5'-dihydroxydiamyl ether; tetrahydrofuran-2,5-dipropanol; tetrahydrofuran - 2,5-dipentanol; 2,5 - dihydroxytetrahydrofuran; tetrahydrothiophene-2,5-dipropanol; tetrahydropyrrole-2,5-propanol; 4-hydroxy-3,3-hydroxytetrahydropyran; 2,5-dihydroxy-3,4-dihydro-1,2-pyran; 4,4'-sulfinyldipropanol; 2,2 - bis(4-hydroxyphenyl)-propane; 2,2'-bis(4-hydroxyphenyl) - methane, and the like.

Examples of modifying oils that may be combined with the aforementioned alkyds include linseed oil, rapeseed oil, cottonseed oil, chinawood oil, castor oil (including raw castor oil and dehydrated castor oil), soya bean oil, perilla oil, oticica oil, linseed oil acids, coconut oil fatty acids, ricinoleic acid, fatty acid glycerides, e.g. the glycerides of linoleic and linolenic acids, palmitic acid, oleic acid, stearic acid, fish oils, fish oil acids, etc. The amount of modifying oil may be varied widely and may range from about 5% to 70%, preferably from about 10% to 15% by weight of the total weight of the modifying oil, the polyhydric alcohol, the polybasic acids (or anhydride if it is used) present in the reaction mixture designed to make the alkyd resin.

Emulsion-based paints usable on the cured low-shrink polyester-based resin comprise a wide variety of types such as conventional 65/35 styrene/butadiene copolymer latices, styrene/butadiene latices modified with the non-drying, semi-drying, drying, etc. oils disclosed above, the acrylic-based latices and the like. These coating materials are made by emulsion polymerization of the particular monomer or monomer mixtures and thereafter loaded (by admixture) with the other ingredients such as oils, colorants, and stabilizers.

In addition to the alkyd-based and emulsion-based paints described above, other paints may be used such as lacquers, varnishes, and other polymeric-type coatings; examples of these include ethyl cellulose, nitrocellulose, cellulose acetate, cellulose acetobutyrate, vinylidene chloride, polyvinyl chloride, styrene-acrylonitrile, and others such as acrylates, methacrylates, etc. Still other paints such as oil-modified phenolic resins and oil-modified phenol-formaldehyde resins, urea-formaldehyde resins, melamine-formaldehyde and aniline-formaldehyde resins are also usable and fully contemplated in this invention.

The paint may be applied in a variety of ways such as by a paint brush, spraying, dipping, roll coating, electrostatic spraying, photolithographing, rotogravure printing, silk screening, etc. As the benefits accruing from the addition of these nitrogen-containing vinyl monomers is primarily the increased paint adhesion, the method of applying the paint to the polyester resin surface is of no particular importance as long as the proper coating and the proper thickness is applied to the surface.

Following are examples given to show one skilled in the art an indication of how to practice the invention as well as to indicate some of the beneficial aspects thereof; namely, the increased adhesion of the paint to the finished low-shrink polyester-based resin surface. Unless otherwise noted, all parts are in parts by weight per 100 parts of polyester-based resin and all percentages are percentages by weight. The examples show the results of an adhesion test; this test is performed by scratching ten parallel lines 1/16 of an inch apart on the surface of the painted polyester resin surface. At an angle of about 60° from these lines another set of ten parallel lines 1/16 of an inch apart are scratched with the same knife so as to cross the original lines. Thereafter, a piece of masking tape is pressed onto the scratched surface so that the adhesive portion is against the painted surface. The tape is pressed into full adherence with the painted surface and then is stripped away. A passing paint adhesion test is indicated by the lack of paint removed from the area of the scratches; whereas, a failing adhesion test is indicated by pieces of paint from the scratched area remaining on the adhesive of the masking tape. Such a test is widely recognized in the plastics art and widely used especially in the automotive industry.

EXAMPLE 1

Low-shrink polyester-based resin were formulated according to the recipes shown below in Table 1a. The ingredients were added to the viscous polyester-styrene liquid in the order shown and mechanically mixed until a smooth paste was obtained. The glass fibers were mixed in last and the mixtures pressed into smooth 1/8 inch thick sheets, cured under 200 p.s.i. pressure for 4 minutes at 275° F. and then heated in an oven for 10 minutes at 350° F. to complete the cure and drive off any volatile materials. The surface of each panel was then coated with a heat curable epoxy-alkyd paint (828–2108 E. I. du Pont de Nemours & Co., Inc.) and cured for 30 minutes at 325° F. Adhesion and other tests were conducted on the finished panels; the results are shown below in Table 1b.

TABLE 1a

| Ingredients | Sample (parts) | | | | |
|---|---|---|---|---|---|
| | A | B | C | D | E |
| Unsaturated polyester [1] | 154 | 154 | 154 | 154 | 154 |
| Low-shrink additive [2] | 39 | 39 | 39 | 39 | 39 |
| Acrylamide | | 8 | 15 | | |
| Methacrylamide | | | | 8 | 15 |
| Polymerization inhibitor [3] | 0.8 | 0.8 | 0.8 | 0.8 | 0.8 |
| Thickening agent [4] | 4.3 | 4.3 | 4.3 | 4.3 | 4.3 |
| Catalyst [5] | 8 | 8 | 8 | 8 | 8 |
| Mold release [6] | 8 | 8 | 8 | 8 | 8 |
| Low shrink additive [7] | 23 | 23 | 23 | 23 | 23 |
| Filler [8] | 394 | 394 | 394 | 394 | 394 |
| Glass fibers [9] | 123 | 123 | 123 | 123 | 123 |

[1] Sytrenated isopthalic fumarate polyester (65% polyester—35% styrene), Selectron® 50204, PPG Industries (154 parts polyester-styrene solution® 100 parts polyester resin).
[2] 35% solution of high impact grade polystyrene in styrene monomer.
[3] Dibutyl metacresol, Ionol® 45, Shell Chemical Co.
[4] Magnesium oxide in mineral oil, Modifier M, W. R. Grace Co.
[5] Tert-butyl peroctoate, Lupersol® PDO, Lucidol Corp.
[6] Zinc stearate, Lubrazinc®, Witco Chemical Co.
[7] Finely divided polyethylene, Microthene® F510, U.S.I. Corp.
[8] Coated calcium carbonate, Surfex® MM, Diamond Shamrock Corp.
[9] 1/4-inch glass fibers, Owen Corning Fiberglass Co.

TABLE 1b

| Tests | Sample | | | | |
|---|---|---|---|---|---|
| | A | B | C | D | E |
| Adhesion (nine locations on panel): | | | | | |
| Passed | 0 | 5 | 9 | 8 | 9 |
| Failed | 9 | 4 | 0 | 1 | 0 |
| Rockwell hardness "R" | 110 | 110 | 110 | 110 | 110 |
| Izod impact (notched), ft.-lbs | 4.2 | 4.0 | 3.6 | 4.1 | 3.9 |

EXAMPLE 2

Low-shrink polyester-based resins were formulated according to the recipes shown below in Table 2a. The ingredients were added to the viscous polyester-styrene liquid in the order shown and mechanically mixed until a smooth paste was obtained. The glass fibers were mixed in last and the mixture pressed into smooth 1/8 inch thick sheets and cured under 200 p.s.i. gauge pressure for 4 minutes at 275° F. then for 10 minutes at 350° F. The surface of each panel was then coated with a heat curable epoxy-alkyd paint (828–2108 E. I. du Pont de Nemours & Co., Inc.) and cured for 30 minutes at 325° F. Adhesion and other tests were conducted on the finished panels; the results are shown below in Table 2b.

TABLE 2a

| Ingredients | Sample | | |
|---|---|---|---|
| | D | E | F |
| Unsaturated polyester [1] | 154 | 154 | 154 |
| Low-shrink additive [2] | 39 | 39 | 39 |
| Dimethylaminoethyl methacrylate | | 8 | 15 |
| Polymerization inhibitor [3] | 0.8 | 0.8 | 0.8 |
| Thickening agent [4] | 3.9 | 3.9 | 3.9 |
| Catalyst [5] | 8 | 8 | 8 |
| Mold release [6] | 8 | 8 | 8 |
| Low-shrink additive [7] | 23 | 23 | 23 |
| Filler [8] | 394 | 394 | 394 |
| Glass fibers [9] | 123 | 123 | 123 |

[1] Styrenated isophthalic fumarate polyester (65% polyester—35% styrene), Selectron® 50204, PPG Industries (154 parts polyester-styrene solution=100 parts polyester resin).
[2] 35% solution of high impact grade polystyrene in sytrene monomer.
[3] Dibutyl metacresol, Ionol® 45, Shell Chemical Co.
[4] Magnesium oxide in mineral oil, Modifier M, W. R. Grace Co.
[5] Tert-butyl peroctoate, Lupersol® PDO, Lucidol Corp.
[6] Zinc stearate, Lubrazinc®, Witco Chemical Co.
[7] Finely divided polyethylene, Microthene® F510, U.S.I. Corp.
[8] Coated calcium carbonate, Surfex® MM, Diamond Shamrock Corp.
[9] 1/4-inch glass fibers, Owens Corning Fiberglass Co.

TABLE 2b

| Tests | Sample | | |
|---|---|---|---|
| | D | E | F |
| Adhesion (nine locations on panel): | | | |
| Passed | 0 | 9 | 9 |
| Failed | 9 | 0 | 0 |
| Rockwell hardness "R" | 110 | 106 | 110 |
| Izod impact (ft.-lb.) | 6.8 | 7.0 | 5.8 |

These examples clearly demonstrate the enhanced adhesion of paints to cured low-shrink polyester-based resin surfaces obtained by incorporating acrylamide, methacrylamide, and dimethylaminoethyl methacrylate into the resin prior to curing.

EXAMPLE 3

A polyester resin was formulated according to the recipes shown below in Table 3a. The ingredients were added to the viscous polyester-styrene liquid in the order shown and hand mixed with a spatula until a smooth paste was obtained. The glass fibers were mixed in last and the mixture pressed into a smooth ⅛ inch thick sheet and cured under 50 p.s.i. gauge pressure for 4 minutes at 275° F. then for 10 minutes at 350° F. The surface of each panel was then coated with a heat curable epoxy-alkyd paint (828–2108 E. I. du Pont de Nemours & Co., Inc.) and cured for 30 minutes at 325° F. Adhesion and other tests were conducted on the finished panels; the results are shown below in Table 3b.

TABLE 3a

| Ingredients | Sample | | | | |
|---|---|---|---|---|---|
| | J | K | L | M | N |
| Unsaturated polyester [1] | 154 | 154 | 154 | 154 | 154 |
| Low-shrink additive [2] | 39 | 39 | 39 | 39 | 39 |
| Acrylonitrile | 15 | | | | |
| Methacrylonitrile | | 15 | | | |
| Methyl methacrylate | | | 15 | | |
| Dimethylolacrylamide | | | | 15 | |
| Vinyl acetate | | | | | 15 |
| Polymerization inhibitor [3] | 0.8 | 0.8 | 0.8 | 0.8 | 0.8 |
| Thickening agent [4] | 4.3 | 4.3 | 4.3 | 4.3 | 4.3 |
| Catalyst [5] | 8 | 8 | 8 | 8 | 8 |
| Mold release [6] | 8 | 8 | 8 | 8 | 8 |
| Low-shrink additive [7] | 23 | 23 | 23 | 23 | 23 |
| Filler [8] | 394 | 394 | 394 | 394 | 394 |
| Glass fibers [9] | 123 | 123 | 123 | 123 | 123 |

[1] Styrenated isophthalic fumarate polyester (65% polyester–35% styrene), Selectron ® 50204, PPG Industries (154 parts polyester-styrene solution=100 parts polyester).
[2] 35% solution of high impact grade polystyrene in styrene monomer.
[3] Dibutyl metacresol, Ionol ® 45, Shell Chemical Co.
[4] Magnesium oxide in mineral oil, Modifier M, W. R. Grace Co.
[5] Tert-butyl peroctoate, Lupersol ® PDO, Lucidol Corp.
[6] Zinc stearate, Lubrazinc ®, Witco Chemical Co.
[7] Finely divided polyethylene, Microthene ® F510, U.S.I. Corp.
[8] Coated calcium carbonate, Surfex ® MM, Diamond Shamrock Corp.
[9] ¼-inch glass fibers, Owens Corning Fiberglass Co.

TABLE 3b

| Tests | Sample | | | | |
|---|---|---|---|---|---|
| | J | K | L | M | N |
| Adhesion (nine locations on panel): | | | | | |
| Passed | 2 | 1 | 0 | 0 | 2 |
| Failed | 7 | 8 | 9 | 9 | 7 |
| Rockwell hardness "R" | 110 | 112 | 108 | 110 | 109 |
| Izod impact (notched), ft.-lbs | 4.0 | 4.2 | 3.6 | 3.8 | 3.8 |

This example shows that other monomers, even some nitrogen-containing vinyl monomers, do not provide increased adhesion of paint to the surface of cured polyester resins.

EXAMPLE 4

Example 1 was repeated except that the cured panels were painted with a water-based heat curable butadiene/styrene latex paint and cured for 30 minutes at 325° F. Adhesion tests showed that the panels not containing acrylamide or methacrylamide failed in all cases whereas the panels containing acrylamide and methacrylamide as taught by this invention passed in all cases. This example shows that the benefits derived from this invention are not affected by the type of paint used over the curved low-shrink polyester-based resin.

EXAMPLE 5

Example 1 was repeated except a thermoplastic lacquer paint was applied to the cured FRP surface. Adhesion tests showed that the panels not containing acrylamide or methacrylamide failed in all cases whereas the panels containing acrylamide and methacrylamide as taught by this invention passed in all cases. This example further shows that the benefits derived from this invention are not affected by the type of paint used over the cured low-shrink polyester-based resin.

What is claimed is:

1. A heat-curable resin composition containing as essential organic components (A) an unsaturated polyester resin, (B) styrene, (C) a free radical generating catalyst, (D) a mixture of polystyrene and polyethylene as a low shrink additive, and (E), from about 5 to about 30 parts by weight per 100 parts of component (A), of a nitrogen-containing vinyl monomer selected from the group consisting of acrylamide, methacrylamide and dimethylamino ethyl methacrylate, so that after heat-curing, the adhesion of paint to the surface of said composition is greatly improved.

2. The composition of claim 1 wherein component (E) is used in an amount from about 7 to 15 parts by weight per 100 parts of component (A).

3. The product of heat curing the composition of claim 1.

References Cited

UNITED STATES PATENTS 2,724,705  11/1955  Glover.
3,503,921  3/1970  Souza et al.

FOREIGN PATENTS 1,049,574  1/1959  Germany.
1,213,992  4/1966  Germany.

MELVIN GOLDSTEIN, Primary Examiner

U.S. Cl. X.R.
117—138.8 F

PO-1050
(5/69)

UNITED STATES PATENT OFFICE
CERTIFICATE OF CORRECTION

Patent No. 3,830,875  Dated  August 20, 1974

Inventor(s) Edmund R. Meincke and Willem J. van Essen

It is certified that error appears in the above-identified patent and that said Letters Patent are hereby corrected as shown below:

Column 4, line 38, which reads: "acd" should read ---acid---.

Column 5, line 61, which reads: "resin" should read ---resins---.

Column 6, line 14 (Table 1a - Footnote #1), which reads: "solution ®" should read ---solution =---.

Column 6, line 20 (Table 1a - Footnote #9), which reads: "Owen" should read ---Owens---.

Signed and sealed this 29th day of October 1974.

(SEAL)
Attest:

McCOY M. GIBSON JR.
Attesting Officer

C. MARSHALL DANN
Commissioner of Patents